(12) United States Patent
Goski et al.

(10) Patent No.: US 10,378,823 B2
(45) Date of Patent: Aug. 13, 2019

(54) REINFORCED REFRACTORY CONTAINERS

(71) Applicants: Dana G. Goski, Columbus, OH (US); Douglas K. Doza, Plain City, OH (US); Anthony S. DiSaia, Powell, OH (US); Duncan Lawrie, Girard, PA (US)

(72) Inventors: Dana G. Goski, Columbus, OH (US); Douglas K. Doza, Plain City, OH (US); Anthony S. DiSaia, Powell, OH (US); Duncan Lawrie, Girard, PA (US)

(73) Assignee: ALLIED MINERAL PRODUCTS, INC., Columbus, OH (US)

(*) Notice: Subject to any disclaimer, the term of this patent is extended or adjusted under 35 U.S.C. 154(b) by 403 days.

(21) Appl. No.: 13/957,428

(22) Filed: Aug. 1, 2013

(65) Prior Publication Data

US 2014/0038119 A1 Feb. 6, 2014

Related U.S. Application Data

(60) Provisional application No. 61/678,625, filed on Aug. 1, 2012, provisional application No. 61/752,970, filed on Jan. 15, 2013.

(51) Int. Cl.
*F27D 5/00* (2006.01)
*B29C 39/18* (2006.01)
*B22D 41/02* (2006.01)
*F27D 1/00* (2006.01)

(52) U.S. Cl.
CPC ........... *F27D 5/0006* (2013.01); *B22D 41/02* (2013.01); *B29C 39/18* (2013.01); *F27D 1/0009* (2013.01); *F27D 5/0068* (2013.01)

(58) Field of Classification Search
CPC .... F27D 5/0006; F27D 5/0068; F27D 1/0009; B22D 41/02; C30B 15/10
USPC .................................................. 432/262, 265
See application file for complete search history.

(56) References Cited

U.S. PATENT DOCUMENTS

| 64,558 A | 5/1867 | Newman | |
| 3,112,841 A * | 12/1963 | Martinelli | ............ B65D 43/021 206/515 |
| 3,556,893 A | 1/1971 | Ruoff | |

(Continued)

FOREIGN PATENT DOCUMENTS

| CN | 101839643 A | 9/2010 |
| CN | 202244686 U | 5/2012 |

(Continued)

OTHER PUBLICATIONS

The International Search Report for PCT/US2013/053320, dated May 19, 2014.

(Continued)

*Primary Examiner* — Steven B McAllister
*Assistant Examiner* — Ko-Wei Lin
(74) *Attorney, Agent, or Firm* — Porter Wright Morris & Arthur LLP

(57) ABSTRACT

A reinforced refractory container having a cast refractory container which includes a sidewall defining an interior volume, the sidewall having inner and outer surfaces, the container cast from a castable refractory composition, and a wound, continuous fiber tensile reinforcement structure integrated with the container sidewall. A method of fabricating the reinforced refractory container is also provided.

11 Claims, 6 Drawing Sheets

(56) References Cited

U.S. PATENT DOCUMENTS

| | | | |
|---|---|---|---|
| 5,110,096 A * | 5/1992 | Zacharias | B22D 11/10 |
| | | | 266/227 |
| 5,332,200 A | 7/1994 | Gorin et al. | |
| 6,400,749 B1 | 6/2002 | Weiss | |
| 7,176,153 B2 | 2/2007 | Anderson | |
| 8,007,712 B2 | 8/2011 | Bewlay et al. | |
| 2002/0029724 A1 | 3/2002 | Mott | |
| 2002/0088390 A1* | 7/2002 | Thebault | C30B 15/10 |
| | | | 117/200 |
| 2003/0051795 A1 | 3/2003 | Burgess | |
| 2007/0039717 A1* | 2/2007 | Inagaki | H01L 23/473 |
| | | | 165/80.4 |
| 2009/0211517 A1 | 8/2009 | Kato et al. | |
| 2010/0116198 A1 | 5/2010 | Hirose et al. | |
| 2011/0111209 A1 | 5/2011 | Weiss | |
| 2011/0139797 A1 | 6/2011 | Reeves et al. | |
| 2011/0243180 A1 | 10/2011 | Kolberg et al. | |
| 2012/0052196 A1 | 3/2012 | Ma et al. | |

FOREIGN PATENT DOCUMENTS

| | | |
|---|---|---|
| EP | 0913504 A1 | 5/1999 |
| GB | 2168284 A | 6/1986 |
| GB | 2238785 A1 | 6/1991 |
| GB | 2238859 B1 | 6/1991 |
| JP | 11255587 A * | 9/1999 |
| JP | 2011157230 A | 8/2011 |

OTHER PUBLICATIONS

The Written Opinion for PCT/US2013/053320, dated May 19, 2014.
English machine translation of CN101839643, Sep. 22, 2010.
English machine translation of CN202244686, May 30, 2012.
English machine translation of JP11255587, Sep. 21, 1999.
English machine translation of JP2011157230, Aug. 18, 2011.

* cited by examiner

REINFORCED REFRACTORY CONTAINERS

CROSS REFERENCE TO RELATED APPLICATIONS

This application claims priority to U.S. Provisional Patent Application No. 61/678,625, filed on Aug. 1, 2012, entitled "Reinforced Refractory Bodies." This application also claims priority to U.S. Provisional Patent Application No. 61/752,970, filed on Jan. 15, 2013, entitled "Reinforced Refractory Containers." The entire disclosure of the foregoing provisional patent applications are incorporated by reference herein.

BACKGROUND

Cast (i.e., molded) refractory containers are used for a variety of purposes. For example, and as further discussed herein, cylindrical, open-ended refractory rings are stacked in order to create an internal volume in which carbon articles are graphitized (e.g., via induction heating). Other types of refractory ceramic containers are employed for various other high temperature applications, including those often termed "refractory crucibles," which are typically made of various ceramic compositions.

Graphite and graphite composite articles are used for a wide variety of products and components, due in part to their electrical properties as well as their machinability which allows for the fabrication of a wide variety of intricate parts. First, however, the articles formed from carbon and carbon composites must be sintered (graphitized) at high temperatures (up to 2,750° C., or even higher) for long periods (sometimes several days) at various pressures (including a vacuum). Graphitization converts the carbon into a crystalline form, and the required temperature of the graphitization process depends upon the precursor materials and the desired final properties of the graphite articles.

Graphitization is typically performed via induction susceptor heating, often using coreless induction coils. In these processes, heat is transferred indirectly to the carbon articles. For coreless induction coils, refractory rings are stacked inside a water-cooled induction coil. The carbon parts, along with a susceptor (typically made of graphite), are packed inside the refractory rings. The susceptor is then heated via induction, which in turn heats the parts to be graphitized by radiant heat. The induction coil can be quite large (e.g., up to 10 feet in diameter and 15 feet tall, or even larger). The outer diameter of the refractory rings stacked inside the induction coil is smaller than the inside diameter of the induction coil, as the coil typically does not contact the outside of the refractory rings. The rings are sized for both the size of the induction coil as well as the types of articles being sintered.

Older refractory rings often utilized machined graphite rings, since the induction coils were typically very small in diameter (e.g., less than a foot). As induction furnaces increased in size, machined graphite segments were assembled to form rings, sometimes 10 feet in diameter. Machining of graphite is very expensive and time consuming, and wrought with size limitations for monolithic pieces. In addition, the use of segmented refractory rings allows for thermal filler leakage between the assembled bricks, and the graphite would oxidize over time.

More recently, segmented machined graphite components have been replaced with precast SiC rings. Such rings are typically made of a high SiC containing (80% or higher) castable refractory composition, bonded with calcium aluminate cement. However, during use steep thermal gradients from the inside to the outside of the ring typically arise during use, and these thermal gradients often cause fracture in these precast rings. In an effort to prevent such fractures, 1 to 10% by weight of metallic fibers (e.g., ¾" to 1", or longer) are added to the refractory castable as crack propagation arrestors. Such fibers are typically made of stainless steel (e.g., 304 SS). Nevertheless, thermal and mechanical stresses imposed by rapid heat-up schedules and higher power induction processes overpower the mechanical deterrent provided by the metallic fibers. In addition, higher metallic fiber content may draw power and couple with the induction field, resulting in power losses and invoking unwanted high thermal expansion in the metallic fibers themselves.

Another type of refractory container in common use are refractory crucibles typically made of various ceramic compositions. Refractory crucibles are used, for example, to melt or otherwise process at very high temperatures, glass, metals, or other substances which require high temperature processing.

By way of further specific example, refractory crucibles are often used to melt glass, and their compositions and shapes have changed little over the past 200 years. See, for example, U.S. Pat. No. 64,558, issued May 7, 1867, incorporated by reference herein. Such crucibles, or refractory pots as they may also be known to those familiar with the art, are manufactured in a variety of shapes and sizes including cylindrical shapes. Various other cross-sectional shapes are also used such as round, elliptical, oval, square (including rounded square), rectangular (including rounded rectangular) or other shapes. Refractory pots typically have a closed bottom and an open top similar to a cup shape. When viewed from the side, in cross-section, the bottom of the refractory pot may be flat, rounded, tapered (e.g., where the bottom meets the interior and/or exterior sidewall of the container), or various combinations of the foregoing.

Some refractory ceramic crucibles are produced as small, monolithic structures the size of a human thumb. These small crucibles are often used, for example, in heating small samples where weight loss is being monitored along with temperature. In large scale production operations, on the other hand, refractory ceramic crucibles can be extremely large—such as ten feet tall (or more) with a four foot feet wide (or more) outer diameter, a wall thickness up to several inches (or more), and weighing several thousand pounds.

Refractory crucibles are produced by any of a number of traditional and non-traditional methods. These include isostatic pressing for small crucibles made of ceramic oxides or silicon carbide (with bonding agents as necessary), jiggering for clay-graphite systems, hand packing clays in the case of traditional glass pots, slip casting ceramic slurries into molds for small laboratory crucibles or casting monolithic refractory castables into pot weighing up to several thousand pounds.

There are generally two types of refractory crucibles: those that are intended to be self-supporting, and those that are not. The latter are typically seated inside another container, such as crucibles which are to be inserted inside an induction furnace with a backup refractory material surrounding it. Dry, vibratable refractory material is typically compacted from a granular form under and around the crucible inside the induction furnace. The material to be melted is then contained and heated within the crucible. An alternate type of crucible is one in which the sidewalls are completely self-supporting. These self-supporting or standalone crucibles may be seated on a pedestal or support base and heated from the outer side of the crucible, such as in a gas-fired furnace structure. These crucibles are used, for example, to liquefy the contents of the crucible, such as a glass composition.

Self-supporting refractory crucibles (or pots) such as those used to melt or process zinc, aluminum, copper, various alloys, other metals or glass are typically limited in size. Examples of these types of small-scale, self-supporting refractory containment vessels are made by Morgan Thermal Ceramics and Emhart Glass Manufacturing, Inc. There are a variety of reasons these crucibles are often limited in size. For example, the walls often need to be thin enough to allow heat transfer through the thickness of the wall in order to heat the contents of the crucible, while keeping the operating costs economical. Refractory crucibles having thicker walls take longer to heat, and increased heat input (i.e., increased operating costs). While thinner refractory crucible walls may require less heat input, they also may be more susceptible to premature failure. In addition, the strength of the refractory material at operating temperature may not be sufficient to withstand the head pressure from the weight of the molten liquid and the associated stress from holding the molten liquid contents, such that the crucible wall bows or stretches, and ultimately fails. On the other hand, if the refractory ceramic crucible wall is too thick in these self-supporting designs, the crucible wall becomes susceptible to thermal shock damage due to differential thermal expansion, also creating failure. For example, a glass pot heated from the outside will cause the pot to be hotter at the outer surface than the inner surface, thereby resulting in uneven thermal expansion which can result in stress cracks.

Common failure modes for glass pots and other self-supporting refractory crucibles include the loss of floor and side wall integrity through cracking induced by thermal expansion differentials. In ovoid or square self-supporting, cross-sectional shapes, cracking at a corner wall or a vertical wall often occurs. In some applications, self-supporting crucibles are preheated and then moved into place, thereby creating another thermal shock situation which can result in crack formation and propagation. In other instances, particularly crucibles used in induction furnaces, cracks often arise due to mechanical damage or abuse (e.g., resulting from the lifting mechanisms used to insert the crucible into the furnace, which place bending moments on the sidewalls thereby causing damage), as well as thermal shock. In other instances, mechanical flaws originating during fabrication can also lead to cracking.

Thus, refractory containers such as refractory rings used in induction furnaces as well as refractory crucibles will often fail prematurely for a variety of reasons, including extreme temperatures, wide temperature variations during use, large temperature gradients which lead uneven thermal expansion, mechanical damage, flaws arising during fabrication, and other reasons. While a variety of techniques may exist for preventing or delaying such failures, or otherwise extending the useful life of refractory containers such as the incorporation of reinforcement using metal fibers, it is believed that no one prior to the inventor have made or used an invention as described herein.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings. In the drawings, like numerals represent like elements throughout the several views.

Figure 1:
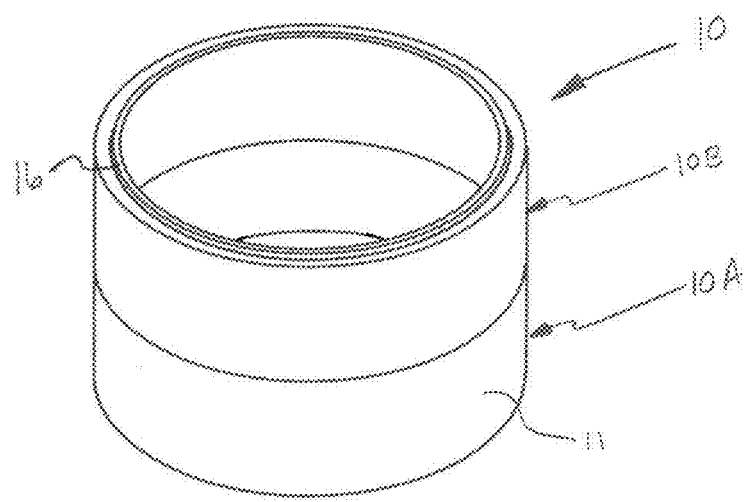
FIG. 1 depicts a pair of refractory rings stacked on top of one another for use, for example, in a graphitization induction furnace.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples should not be used to limit the scope of the present invention. Other features, aspects, and advantages of the versions disclosed herein will become apparent to those skilled in the art from the following description. As will be realized, the versions described herein are capable of other different and obvious aspects, all without departing from the invention. Accordingly, the drawings and descriptions should be regarded as illustrative in nature and not restrictive.

As used herein, the term "container" means a walled structure defining an interior volume configured to contain a mass or volume of material (solid, liquid and/or gas) therein, whether statically or transiently (e.g., an open-ended tube or duct), wherein the interior volume is defined and encompassed by a sidewall which extends about the interior volume. By way of example, refractory container (10) in FIG. 1 has a circular cross-sectional shape defined by sidewall (11) which extends about interior volume (12), while the lower portion (118) of refractory container (110) has an oval cross-sectional shape defined by sidewall (119). The interior volume defined and encompassed by the sidewalls generally extends between opposing ends, which may or may not be open (or may be partially open). In some instances, both opposing ends of a container are open, such as in the case of refractory rings used in graphitization induction furnaces or other open-ended cylinders or tubes such as various forms of duct work. Other containers, such as refractory crucibles typically have one closed end (e.g., the bottom wall of a cup-shaped crucible) and one open end (or an end fitted with a removable lid or top/bottom portion). In the embodiment shown in FIG. 11, for example, refractory crucible (110) has an interior volume (112) of oval (e.g., elliptical) cross-section defined by sidewall (119) of lower portion (118) of the crucible. The interior volume (112) is closed at the bottom by bottom wall (121), while the upper end of the interior volume (112) is open (but normally covered during use by removable lid (116). Other forms of containers, as used herein, have one or both ends partially enclosed. Still other containers are fully enclosed, in some instances having a removable lid or top portion, while in other instances having one or more access ports of other openings to allow access to the interior volume of the container.

Thus, as used herein, refractory containers encompass a wide variety of structures formed of a refractory material, including, for example, refractory rings (also referred to in the art as refractory liners or lining), closed and open ended cylinders, high-temperature containers, crucibles, pots, reactors, vessels, tanks, drums, barrels, pipes, tubes, various refractory shapes utilized for transfer or conveyance therethrough of molten material or hot gas(es) (e.g., pouring tubes, pumping legs, and duct work). and various other refractory containers known to those skilled in the art or hereafter developed.

As discussed previously, refractory containers are typically subjected to high temperatures, wide and/or repeated temperature changes, and differences in temperature between two or more portions of the container such as temperature differences between the inside and outside faces of the container (i.e., temperature gradients). These thermal stresses often lead to failure of the refractory container, particularly the formation of cracks in one or more walls of the container and/or at a juncture between adjacent walls (e.g., at a corner where a sidewall intersects a bottom wall of a container). In some instances, failures result solely from the normal use of the refractory container due to things such as thermal shock, thermal and/or mechanical stresses, and uneven thermal expansion through a wall thickness (e.g., outer portion of wall expands more than inner portion due to temperature differences). In other instances, refractory containers fail prematurely due to mechanical abuse such repeated lifting of heavy refractory containers which induce bending moments or other mechanical stress, either alone or in combination with thermal stresses from normal use. In still other instances, refractory containers fail prematurely due to inherent flaws in the container which arise during fabrication, with such flaws causing container failure either alone or in combination with mechanical abuse and/or thermal stresses which arise from normal use.

By way of example, refractory rings will typically fail on the tension face. Temperature differences through the thickness of the ring, for example, will create mechanical tensile forces on the exterior of the ring induced by differences in the amount of thermal expansion through the wall thickness due to temperature gradients. Excessive mechanical force is built up from the interior surface in the direction of the outer surface of the refractory ring, exceeding the refractory material's tensile strength and causing ring fracture. While the addition of chopped metal fiber reinforcement helps prevent such ring failure, these metal fibers add significant weight to the refractory rings and only provide limited prevention or delay of ring failure.

Applicants have discovered that refractory container wall failure can be reduced (e.g., delayed or, in some cases, prevented entirely) by integrating a tensile, wound continuous fiber reinforcement structure with the refractory container. The preform is formed by co-winding one or more continuous, unbroken fiber tows about a mandrel. The wound fiber reinforcement structure is referred to herein as a "preform," since it is formed separately from the refractory container, and then integrated with the refractory container during casting (i.e., molding) of the refractory container. In some embodiments, the fiber preform is located entirely within one or more walls of the container such that it is not visible, while in other embodiments the preform is embedded at least partially within in one or more outer walls of the container. Partially embedded means that at least some portion of the fiber tows extend outwardly away from the outer surface of the container wall, while fully embedded means that the outer surface of the container is smooth (the fiber tows do not protrude from the refractory outer surface) yet at least a portion of the tows are visible. And in still further embodiments portions of the fiber preform may be entirely within one or more walls of the container, while other portions are embedded in one or more walls of the container.

In some embodiments the wound continuous fiber preform comprises a tubular portion having a cross-sectional shape generally corresponding to the cross-sectional shape of at least a portion of the refractory container, particularly the cross-sectional shape defined by the one or more conjoined sidewalls which encompass the interior volume of the container. As used herein, "tubular" is not limited to structures having a circular cross-sectional shape. Rather, the tubular portion of the preform may be configured to have any of a variety of cross-sectional shapes generally corresponding to the cross-sectional shape of at least a portion of the refractory container, such as circular, oval, square (including rounded square), ovoid, or other regular or irregular shapes. The tubular portion also me be straight or tapered, including multiple tapers (e.g., a tubular shape which is narrowest in the middle, similar to, for example, an hour glass shape).

Figure 2:
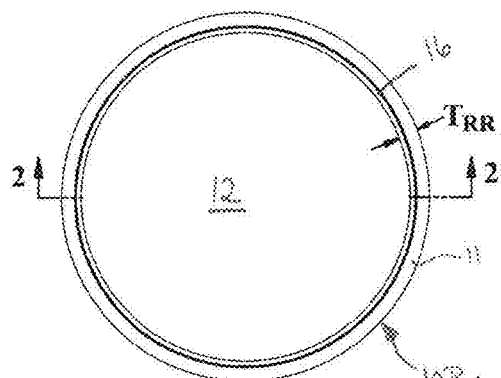
FIG. 2 depicts a top plan view of the stacked refractory rings of FIG. 1, wherein the internal volume of the stack is identified at (12).
Figure 3:
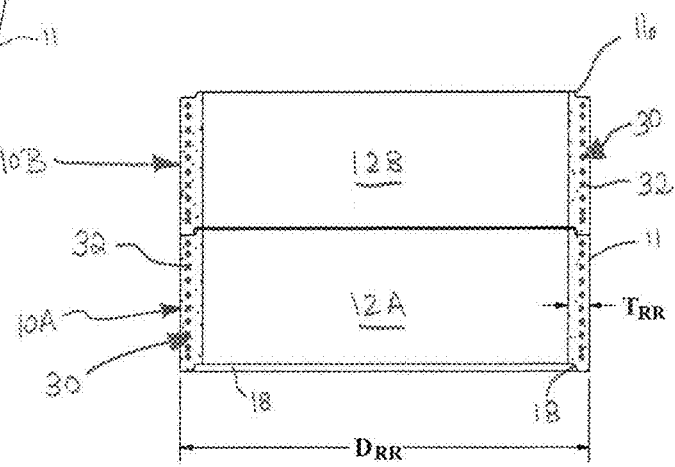
FIG. 3 depicts a cross-sectional view of the stacked refractory rings of FIG. 2, taken along the line 3-3 thereof.
Figure 4:
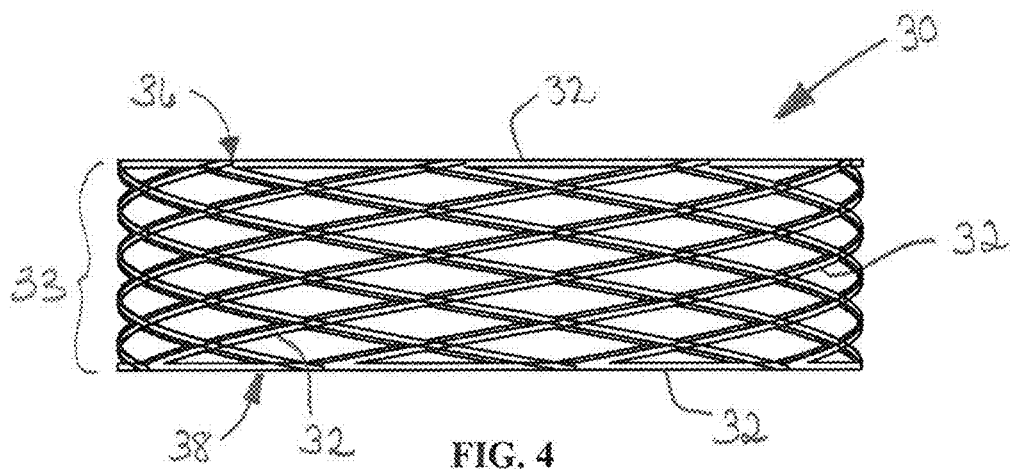
FIG. 4 depicts a side plan view of one embodiment of a fiber wound reinforcement structure (or preform) used in the refractory rings of FIG. 1
Figure 5:
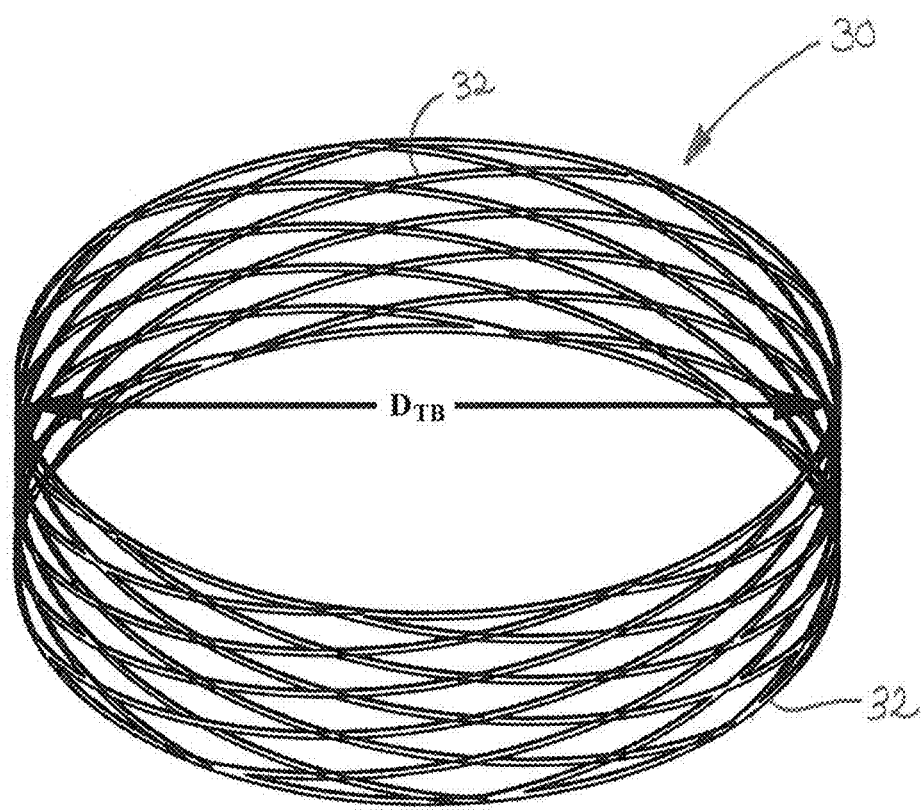
FIG. 5 depicts an isometric view of the fiber preform of FIG. 4.

Some embodiments of the wound fiber preform comprise an open-ended tubular arrangement, For example, in one particular embodiment the fiber preform comprises a container-shaped, cylindrical belt (30) such as that shown in FIGS. 4 and 5. Preform (30) comprises a tubular structure with open upper and lower ends (32, 34). Fiber preform (30) is configured for reinforcing and supporting, for example, open-ended cylindrical refractory rings (e.g., as depicted in FIGS. 1-3).

Embodiments of the fiber preforms described herein are sized and configured so as to correspond with that of a refractory container, or in some cases a portion of a refractory container, in need of reinforcement. Such reinforcement may be needed not only for tensile reinforcement (e.g., to withstand bending moments arising from temperature gradients), but also for any of a variety of other reasons such as to prevent mechanical failure arising from damage, abuse or flaws in the casted refractory. After manufacture, the wound fiber preform is generally located either on the exterior of the refractory container, or within a the wall of the container (i.e., encapsulated within the refractory material). In some embodiments, the tensile, wound fiber preform is located within the outer half of the wall of the refractory container, including, in some instances, at the outer wall.

Figure 8:
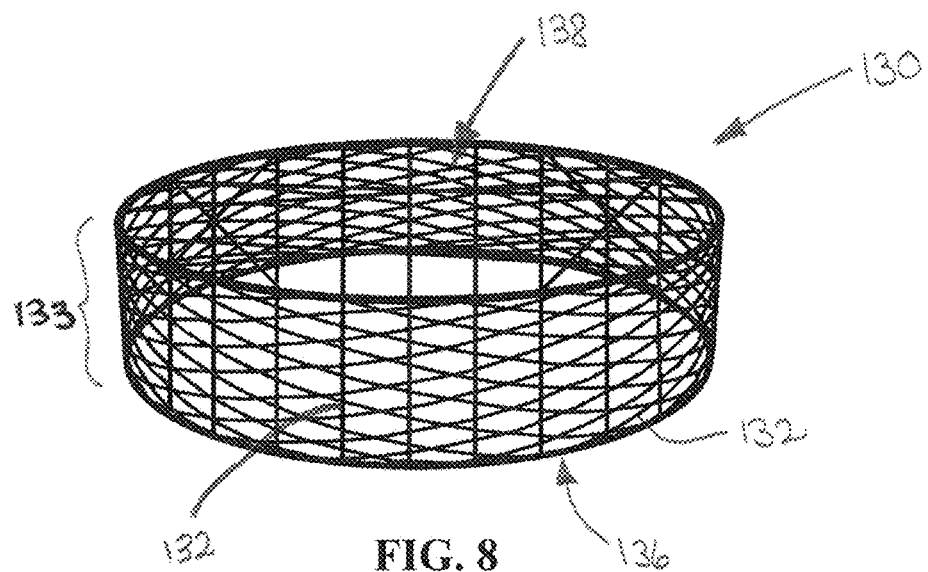
FIG. 8 depicts an isometric view of an alternative embodiment of a fiber wound reinforcement structure (or preform) for use in, for example, the refractory container (or crucible) shown in FIG. 11.

In other embodiments, the wound fiber preform includes endwall portions at one or both ends of the tubular portion. By way of example, preform (130) shown in FIGS. 8-10 includes a tubular section (133) having an open upper end (136) and a fiber mesh bottom wall (138), thus providing a wound fiber preform (130) which generally has a cup shape. As also seen in FIGS. 8 and 10, tubular section (133) has an oval cross-section, and is shaped to be integrated with refractory container (110) shown in FIGS. 11-14. In contrast, a tubular section having no endwalls will generally have a belt shape, such as a cylindrical belt or hoop with wound fiber walls (e.g., an open weave).

As further discussed below, the tensile, wound continuous fiber preforms described herein are fabricated from one or more continuous tows or yarns of fibers, such as carbon, glass, SiC-based or oxide (e.g., alumino- or aluminosilicate-based) fibers. As is known to those skilled in the art, carbon fiber tows or glass, SiC-based or oxide fiber yarns comprise numerous individual and continuous filaments joined together to form a single, continuous strand. In fact, carbon fiber tows, for example, often comprise thousands of individual, continuous filaments joined together (e.g., using a binder). The term "tow" is typically used for multifilament carbon fiber strands, and "yarn" is used for multifilament strands of glass, SiC-based or oxide fibers (often in the form of twisted strands). In order to simplify the present disclosure, unless the context indicates otherwise, tow and yarn are used interchangeably in the present application. Thus, where the term yarn is used, it is understood that "tow" could also be used in place of the yarn, and vice versa. Similarly, where a phrase such as "yarn or tow" is used, it should be understood that either a fiber yarn or fiber tow may be used.

In one embodiment, the tensile preform is formed from the fiber tow(s) by winding the tow(s) around a rotating mandrel using, for example, a multi-axis fiber winding machine. The cross-sectional shape of the mandrel (perpendicular to an axis of mandrel rotation) will generally correspond to desired cross-sectional shape of the tubular section of the fiber preform, such as corresponding to the cross-sectional shape of the refractory container such as round, oval, square (including rounded square), ovoid, or other regular or irregular shape. In some embodiments wherein a tapered preform is desired, the mandrel is similarly tapered. If a bottom wall and/or top wall is desired in the preform (e.g., preform (130) in FIG. 8), the fiber tow(s) is wrapped over one or both ends of the mandrel. Similarly, in some embodiments an end of the mandrel is curved rather than flat for applications in which a curved bottom and/or top end wall of the preform is desired. Likewise, in other embodiments an end of the mandrel is tapered (straight or curvingly) between the sidewall and an end of the mandrel in order to provide a tapered transition between the tubular section and the bottom or top wall of the preform (e.g., preform (230) in FIGS. 11-14). It will also be understood that tension is applied to the fiber tow(s) during winding such that the fiber tow(s) of the resulting preform will be under tension.

Applicants testing of refractory containers having a tensile, continuous fiber, wound preform integrated therein has demonstrated that these preforms provide remarkable improvement in the longevity of the refractory structure. By way of example, unreinforced refractory rings used in graphitization furnaces often cracked after only 1 or 2 cycles of graphitizing product (e.g., a cycle of heating up to graphitization temperature, and then cooling to remove the graphitized product). The addition of high percentages of chopped stainless steel fibers provided, at most, 20 heating cycles of use before failure (cracking of the ring wall). When reinforced with a fiber preform such as that shown in FIG. 5, on the other hand, the refractory rings are still in use, without cracking after 24 and 33 heating cycles. The fiber preform reinforced and chopped metal fiber reinforced rings were the same size, were casted using similar refractory composition, and have been used comparable operating conditions. Nevertheless, the addition of the lightweight, inductively invisible, tensile continuous fiber preforms described herein have significantly, and surprisingly extended the useful life of the refractory containers.

Applicants believe that the tensile, continuous fiber, wound preforms described herein prevent or delay refractory container failure in a number of ways. First, because the preforms are formed by winding continuous fibers about a mandrel (in some cases followed by curing) and then integrating the preform with the refractory container during casting of the container, the container shape mimicking tensile preform maintains hoop stress and provides compressive force which counteracts the temperature-induced expansion of the refractory container during use. In the case of refractory rings, for example, the rings experience significant temperature gradients during use. The hotter, interior portion of the ring will expand more than the outermost portion, and this thermal gradient causes a ring bending moment which can ultimately cause a failure of the refractory ring. Applicant's tensile preform (e.g., belt (30)), however, provides considerable flexural strength to the wall, even at the elevated temperatures the refractory rings will experience during use.

In addition, free-standing or unsupported refractory containers such as refractory crucibles, pots or containment vessels will often creep at high temperatures under the load of whatever material is contained within them during use. The tensile preforms described herein provide additional strength at the elevated temperatures of use, reducing bowing of the refractory container walls during use while simultaneously minimizing the propagation of cracks due to thermal stresses between the hot outer wall and cooler inner wall of the container (for refractory containers heated from the outside in during use).

Turning now to the specific embodiment shown in FIGS. 1-5, a stack (10) of refractory rings (10A, 10B) is depicted. The refractory ring (10A, 10B) has an interior volume (12) defined and encompassed by annular sidewall (11). The interior volumAs is typical in the art (although not always), refractory rings (10A, 10B) have a diameter which is greater than their height. As is shown in FIG. 1 the rings are typically stacked on top of each other inside an induction coil (not shown) of a graphitization furnace assembly. A graphite susceptor (not shown) is positioned within the interior of the refractory rings. Of course any number of refractory rings may be stacked on top of one another in order to provide a furnace of the desired size, and the two-stack arrangement shown in FIGS. 1-3 is merely exemplary.

Refractory rings (10A, 10B) (also referred to as refractory liners or lining) generally comprise open-ended, cylindrical rings cast from any of a wide variety of castable refractory materials and compositions. To cast (i.e., mold) the rings (10A, 10B), the castable refractory composition is poured or otherwise inserted into a suitably sized and shaped mold. Thereafter, the ring (10A, 10B) is fired (i.e., heated) or otherwise cured in order to form a relatively rigid, hard structure suitable for use in an induction furnace. If desired, two or more refractory rings (10A, 10B) can be stacked on top of one another, and then fired in situ.

In order to facilitate stacking of the completed rings, refractory rings (10A, 10B) are molded so as to include an upwardly extending, circumferential flange (16) on the upper end surface of the ring (10A, 10B). Flange (16) extends around the entire periphery of the upper end surface, along the inner edge thereof. A corresponding mating shoulder (18) is provided in the bottom end surface of the ring (10A, 10B) in order to guide and facilitate ring stacking. This arrangement provides a shiplap joint between the stacked rings. Of course other embodiments of the refractory rings include a variety of alternative end wall features which facilitate stacking of the completed rings on top of each other. For example, a rounded or dovetail-shaped flange or lip can be provided on one end wall of the ring, and a matingly-shaped shoulder or groove provided in the other end wall of the ring. As yet another alternative one or more bumps, guide rods, or other protrusions can be provided on one end wall of the ring, and one or more matingly-shaped grooves, depressions, apertures, cavities or features provided in the other end wall of the ring. It should also be understood that shoulder (18) may be omitted from the bottom end surface of the lowermost refractory ring of a stack.

A tensile preform, in the shape of cylindrical belt (30) is fabricated from carbon, glass, SiC-based or oxide (e.g., alumino- or aluminosilicate-based) fiber tows/yarns. As is known to those skilled in the art, such fiber tows or yarns typically comprise a large number of individual and continuous monofilaments joined together to form a single, continuous strand (i.e., a tow or yarn). Carbon fiber tows, for example, often comprise thousands of individual, continuous monofilaments joined together (e.g., using a resin or binder). Tensile belt (30) is formed from these fiber tows by winding one or more tows around a cylindrical mandrel, using, for example, a multi-axis fiber winding machine known to those skilled in the art. Any number of winding patterns may be used to form the hoop-shaped, cylindrical belt (30). Tensile belt (30) has a height which is no greater than the height of the refractory ring (10A, 10B). In the embodiment shown in FIGS. 1-5, tensile preform (30) is slightly less than the height of the casted refractory ring such that the tensile preform is completely encapsulated within the refractory ring (10A, 10B). As also seen in FIGS. 4-5, the resulting tensile belt (30) has the shape of an open-ended cylindrical tube, with a mesh-like wall (as further described herein).

Figure 6:
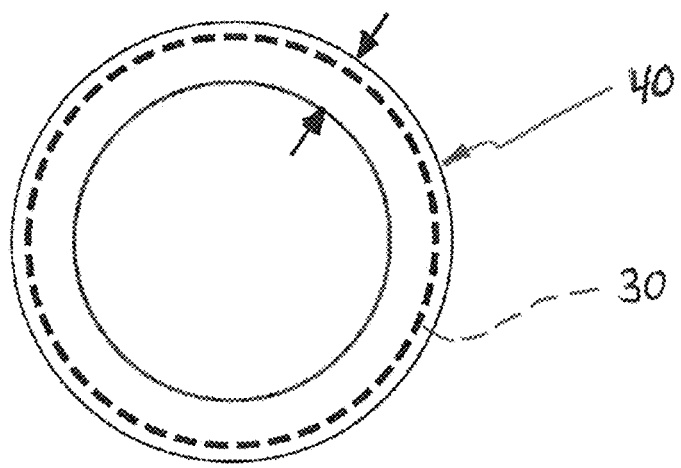
FIG. 6 depicts a top plan view of a mold for casting the refractory rings of FIG. 1, with the fiber preform of FIG. 4 located therein.
Figure 7:
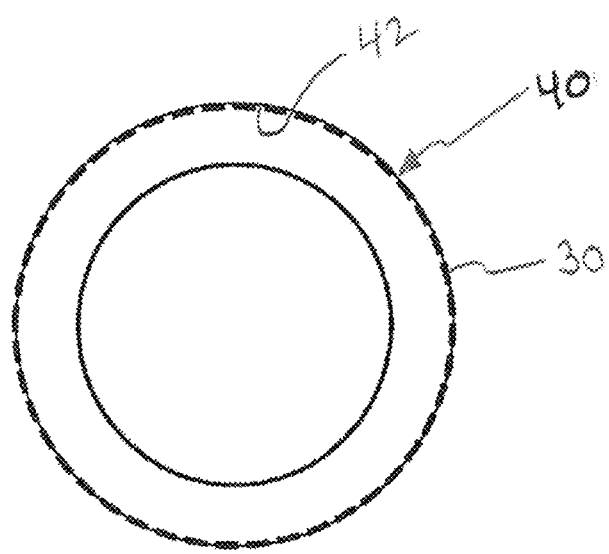
FIG. 7 depicts a view similar to FIG. 6, wherein a larger diameter fiber preform is located therein.

The diameter of tensile belt (30) is generally chosen based on the dimensions of the refractory ring (10A, 10B). In particular, tensile belt (30) is generally located either at the outside surface of the refractory ring (FIG. 6), or within the wall of the ring itself (i.e., encapsulated within the refractory material) (FIGS. 2 and 7). In the particular embodiment shown in FIGS. 2 and 7, the tensile belt (30) is located within the outer half of the wall of the refractory ring. Thus, when the refractory ring has an outer diameter $D_{RR}$ and a wall thickness of $T_{RR}$, the diameter of the tensile belt $D_{TB}$ (measured as the inside diameter) satisfies the following: $(D_{RR}-\frac{1}{2} T_{RR}) \leq D_{TB} \leq D_{RR}$.

In other embodiments, the tensile preform is located within the outer third of the wall of the refractory container. In these embodiments, for example, and in terms of a refractory ring and tensile belt having the dimensions as identified in the previous paragraph, the diameter of the tensile belt $D_{TB}$ (measured as the inside diameter) satisfies the following: $(D_{RR}-\frac{1}{3} T_{RR}) \leq D_{TB} \leq D_{RR}$.

In still further embodiments, the tensile preform is located within the outer fourth of the wall of the refractory container. In these embodiments, for example, and in terms of a refractory ring and tensile belt having the dimensions as identified in the previous paragraph, the diameter of the tensile belt $D_{TB}$ (measured as the inside diameter) satisfies the following: $(D_{RR}-\frac{1}{3} \leq D_{TB} \leq D_{RR}$. Alternatively, in other embodiments the tensile preform is located within the outer fifth, or even the outer tenth of the wall of the refractory container.

When measured in absolute terms, in some embodiments the outer diameter of the tensile preform is no more than 1 inch less than the outer diameter of the final refractory container. In other embodiments, the outer diameter of the tensile preform is no more than ½ less than the outer diameter of the final refractory container. In the latter embodiment (within ½ inch), the tensile preform (e.g., belt (30)) will be located just beneath the outer surface of the refractory container (e.g., ring (10A, 10B)) without being visible. Locating the tensile preform just beneath the outer surface of the refractory container avoids the formation of pock marks during casting. In other words, the tensile preform in some embodiments is as large as possible while still ensuring that the tensile preform is not visible in the final, reinforced refractory container (at least around the outer circumference of the refractory container).

In further alternative embodiments, the tensile perform is located at the outer circumference of the refractory container such that the outer diameter of the tensile perform (e.g., the outer diameter of tensile belt (30)), is approximately the same as the outer diameter of the refractory container (e.g., refractory ring (10A, 10B)), such as depicted in FIG. 7. In some instances, particular when the tensile perform is closely wound such that there is little or no space between adjacent windings, the outer circumference of the tensile perform defines the outer circumference of the refractory container. In these embodiments, the tensile belt or other fiber preform reinforcement structure essentially acts as a mold, or a mold lining, for casting the refractory ring or other refractory container, with little or none (or a minimal amount) of the castable refractory composition penetrating the preform. With open weave fiber windings, on the other hand, some of the refractory castable penetrates the interstices between the tows such that the fiber preform is embedded in the outer surface of the refractory container.

In the particular embodiment of tensile belt (30) shown in FIGS. 4 and 5, the belt is inductively invisible and mechanically constrained (i.e., under tension). As also depicted, the tows or yarns are wound about the mandrel during fabrication such that an open weave structure for the belt is provided (similar in appearance to expanded metal). While a single tow or yarn having a plurality of continuous, monofilament threads can be used to form the tensile preform, tensile belt (30) is formed from a plurality of tows which are wound about the mandrel together. This effectively multiplies the strand size (i.e., multiplying the number of filaments unitarily wound about the mandrel). Thus, a plurality of tows or yarns are co-wrapped around the mandrel to form the tensile belt (30).

By way of one example, one or more carbon fiber tows, each having between 10K and 50K continuous carbon fiber filaments, are co-wrapped around the mandrel. In some embodiments, with the use of a binder, whether pre-preg tows, pultrusion or post-wrapping application, co-wrapped tows are bonded to one another along their lengths so as to essentially form tows of even more continuous filaments.

In one embodiment, the tow(s) are pre-impregnated ("pre-preg") with a binder (also referred to as a resin, or "binder resin"). After winding, the binder is cured such that the tows are secured in position, essentially glued to one another by the binder, and remain under tension. This also ensures that the fiber preform will not collapse prior to being integrated with the refractory container. In another embodiment, pultrusion is used wherein the tows are pulled through a resin bath and wound wet onto the mandrel, and thereafter the resin is cured in place to retain the tows together. In yet another embodiment, the fiber tows are wound "neat," without binder, and the binder is then applied to the tows after winding using a resin-transfer process known to those skilled in the art. In any of these various embodiments the binder may be volatilized when the refractory ring with which the fiber ring is incorporated is fired, producing gasoues products which may gradually permeate out of the refractory or be deposited as solid products within the refractory. In some instances, the binder may react to form residual carbon char, or may even remain in place as is, depending on operating conditions. Under some conditions (e.g., reducing conditions), the binder, or components of the binder, may be entirely redeposited in the microstructure of the refractory (which may even act as an additional carbon source for carbon-containing refractories.

The binder used with the tows of the tensile preform is typically at least partially cured, and in some instances fully cured, before the belt is incorporated with the refractory ring (e.g., by positioning the fiber ring in the mold prior to adding the castable refractory composition). The cured binder will provide some rigidity to the tensile preform which facilitates insertion of the preform into the mold. Since in most instances the binder serves no functional purpose once the preform is incorporated in to the refractory container, the binder need not be fully cured in all instances. All that is necessary is for sufficient curing and/or a sufficiently rigid cured (or partially cured) binder which holds the fiber wound preform together for insertion into the mold and maintaining the preform structure while the refractory material is poured into the mold. Suitable binders include, for example, thermosetting epoxy polymers and phenolic reasons.

In order to incorporate the tensile fiber preform with (including, in some embodiments, into) the refractory container, the preform is secured about the outer periphery of the refractory ring. In other embodiments the refractory ring is cast using a mold in which the tensile belt has been inserted prior to adding the refractory composition. FIGS. 6 and 7 depict top views of tensile belt (30) positioned in a refractory ring mold (40) suitable for casting refractory ring (10A, 10B), prior to pouring the refractory castable material into the mold. The tensile belt (30) has a height which is slightly less than the height of the refractory ring mold. After tensile fiber belt (30) has been fabricated and cured (if desired or necessary), belt (30) is inserted into forming mold (40). In the embodiment shown in FIG. 6, the outer diameter of the tensile belt (30) is slightly less than the outer diameter of the refractory ring (10A, 10B) to be cast using mold (40). (As shown, the thickness of the ring-shaped mold is approximately the thickness of the refractory ring wall.)

In the alternative embodiment shown in FIG. 7, the outer diameter of the tensile belt (30) is approximately the same as that of the refractory ring (10A, 10B) to be cast using mold (40). Thus, the tensile belt (30) fits snugly within mold (40), against the outer wall (42) of the mold interior (the dashed line in FIGS. 6 and 7 indicates placement of the tensile belt within the interior of the refractory ring mold (40)).

When the tensile belt (or the tubular section of other tensile preforms) has an outer diameter less than the outer diameter of the refractory ring (or other portion of a refractory container), the tensile belt (30) is inserted into the mold (40) such that the outer diameter of the tensile belt is evenly spaced from the outer wall of the mold interior (as seen in FIG. 6). The belt (30) may be held in position within the forming mold (40), if needed, by any of a variety of techniques known to those skilled in the art (e.g., using shims which maintain proper spacing between the fiber belt and the interior walls of the mold). For example, when the tensile belt is sized so as to be positioned within the outer ½ of the refractory ring wall, belt (30) is positioned in mold (40) such that belt (30) is spaced inwardly from the outer wall (42) of the mold interior by less than ½ the radial thickness of the mold interior refractory ring), as shown in FIG. 6.

Any of a variety of winding patterns may be employed for winding the fiber tow(s) on the mandreal, depending upon a number of factors (e.g., size of ring, material of and number of filaments/tows, anticipated temperatures during use, thermal expansion properties of the refractory castable, etc.). Therefore, the winding patterns and preform configurations shown herein are merely exemplary of two possible embodiments.

For fabrication of tensile belt (30) shown in FIGS. 4 and 5, the continuous fiber tows are wrapped around a cylindrical mandrel at an angle to the axis of the mandrel (also referred to as helical wrapping). As is known to those skilled in the art, the rotating mandrel and/or fiber spool(s) (or a guide or other structure which guides the fibers onto the mandrel) are reciprocally-moved in the axial direction (i.e., parallel to the axis of the mandrel) during wrapping such that an open weave pattern shown in FIG. 4 results. The rotational speed of the mandrel, as well as the speed of reciprocal axial movement of the mandrel and/or spool (or fiber guide) is adjusted in order to provide the desired wrap angle (with respect to the axis of the mandrel), spacing between adjacent windings, the size of the open areas between adjacent and crossing winding, and other properties of the tensile preform. The wrap angle may be constant or varied (e.g., by varying the speed of reciprocal axial movement of the mandrel and/or spool). As is known to those skilled in the art, these various winding parameters allow for tailoring the tensile preform properties, including, for example, the thermal expansion properties of the tensile preform, tensile strength, elasticity, handling integrity, weight and even cost. Handling integrity of the tensile preform refers to the ease by which the preform may be inserted into the mold without risk of collapse or deformation. Handling integrity is also enhanced by at least partially curing the binder applied to the tows in order to provide additional rigidity and maintain hoop stress in the preform.

The open interstices of the wound tensile preform (i.e., the open spaces between adjacent portions of the continuous tows) also allow the castable refractory composition to flow through the interstices during molding in order to encapsulate the preform and minimize air pockets and other abnormalities. In the case of the molding arrangement shown in FIG. 7, the castable refractory composition will flow through the interstices to the interior outer wall of the mold such that the fiber preform is embedded in the outer wall of the reinforced refractory container (with the outer perimeter of the tows visible from the outside of the casted container).

In the exemplary embodiment of fiber belt (30) of FIGS. 4 and 5, the fiber tows are wrapped about the mandrel at an angle of less than 90 degrees with respect to the axis of the mandrel (thus providing a helical wrap). In one particular embodiment, the wrap angle is between about 60 degrees and about 85 degrees. It will be understood, however, that other embodiments use any of a variety of wrap angles, including variable wrap angles by varying the speed of reciprocal axial movement of the mandrel and/or spool/guide during wrapping.

The choice of fiber material, number of tows/yarns co-wrapped, and even the weave pattern also depends on a variety of other factors, including anticipated operating temperatures and atmosphere, chemical compatibility with any end-use process for the reinforced refractory container, and ultimate mechanical strength at temperature of the fiber. In many embodiments, the nature of the resin or binder for the fiber tows, at least in the cured state, is not significant, as the binder often will burn off during firing or use of the refractory container, and the preform is wound such that the fiber tows will generally not pull apart under their own tension. The primary purpose of the binder is simply to provide some rigidity to the tensile preform to facilitate insertion of the preform into the mold (or otherwise incorporate the preform with the refractory container).

As mentioned previously, the tensile preforms also are not limited to the use of pre-impregnated ("pre-preg") fiber tows or heat-set curing systems. While many pre-preg fiber tows are oven cured after winding, room temperature curing pre-preg fiber tows are employed in some embodiments. Likewise, heat-set curing or room temperature curing binders for pultrusion are also employed in embodiments of the wound fiber preforms. In addition, the fiber preforms are not limited to any particular size, as nearly any size and shape of preform can be fabricated, as needed or desired.

In general, any nonferrous continuous fiber tows/yarns suitable for fiber winding may be used, particularly carbon, glass, SiC-based or oxide (e.g., alumino- or aluminosilicate-based) fibers. In many embodiments, the fiber is selected so as to have a tensile strength which is greater than that of the cured refractory composition. Suitable continuous fibers include, for example:

carbon fiber, both high and low modulus, such as those available from Toray, Hexcel, Cytec, Tenax Toho, and Mitsubushi;

E, R, and S-glass fibers;

Cem-FIL® glass fiber available from Owens Corning;

silica-based continuous glass fiber;

alumino and alumiosilicate-based continuous fibers, such as Nextel® fibers available from 3M, Almax® fibers available from Mitsui Mining, and basalt-based fibers such as those available from Basaltex and Sudaglass; and SiC-based continuous fibers (e.g., Nicalon® fiber available from Nippon Carbon).

Some of the above-described fibers may include various cores or outer claddings, as is known to those skilled in the art (e.g., fibers having a nonferrous metal filament core).

Compared to the addition of chopped metal fibers to refractory rings and other refractory structures which can add considerable weight (e.g., up to 100 pounds for large refractory rings), the tensile preforms described herein add considerably less weight. For example, while chopped metal fibers add as much as 100 pounds to a large refractory ring, fiber belt (30) adds only about 5-20 pounds of additional weight to the same size ring. In addition, unlike these chopped metal fibers, the nonferrous (e.g., carbon or glass) fibers of the tensile preform will not suscept and therefore can advantageously be used in high frequency induction furnaces operating at high temperatures (e.g., about 2400 degrees F. or higher). Chopped metal fibers also may melt at operational temperatures (e.g., above about 2400 degrees F.) and be rendered futile, or may be completely undesirable or chemically incompatible. Embodiments of the wound fiber refractory rings described herein do not suffer from these shortcomings. Nevertheless, in some embodiments wherein the shortcomings of chopped metal fibers are not of concern, up to about 10% by weight of metal fibers (e.g., chopped stainless steel fibers ¾" to 2" in length) are optionally be added to the castable composition prior to molding in order to provide additional strength and prevention of crack propagation.

The tensile preform can be used with any known or hereafter developed refractory castable materials and compositions, including compositions requiring vibration for flowing as well as those having self-flow consistency. The refractory castable material is any material suitable for such purpose known to those skilled in the art, or hereafter developed. In addition, conventional molding and firing processes and steps may be used, as known to those skilled in the art or hereafter developed. For example, after the refractory castable is poured into the mold, the castable material may fill in the mold space above the tensile preform such that the tensile preform is no longer visible (e.g., the upper end surface of the refractory ring (10A, 10B) will completely cover the tensile belt (30), as shown in FIG. 1).

Suitable raw materials for the refractory castable include any known to those skilled in the art such as SiC, alumina, silica, magnesia, graphite, aluminosilicates, zircon-containing materials, chrome aluminates, magnesium aluminates, and alumina-zirconia silicates. One or more of these materials may be included in the castable composition, including both dense and insulating compositions (i.e., classic refractory aggregates). The castable compositions may also include various organic burn-out fibers or non-organic fibers known to those skilled in the art.

Other suitable castables include those described in U.S. Pat. Pub. No. 20120052196, titled Monolithic Graphitic Castable Refractory, which is incorporated herein by reference. The refractory composition is mixed with water and then poured, pumped, injected, sprayed or otherwise added to the container mold.

In one example, a graphite-based monolithic refractory castable material of the type described in U.S. Pat. Pub. No. 20120052196 is employed. In some embodiments, the graphite is synthetic graphite, although other types of graphite, for example super graphite comprising crushed double densified graphite, or the like may be used. The graphite-based monolithic refractory castable material comprises from about 25 to about 80 weight percent of graphite, more specifically, from about 40 to about 80 weight percent of graphite, or, more specifically, from about 50 to about 70 weight percent of graphite, is used. Unless otherwise stated, all weight percents described herein are based on the weight of the monolithic refractory castable material, prior to mixing with water. The graphite provides the compositions with good thermal conductivity. In a specific embodiment, after casting the refractory container using such graphite-based castable materials, the container is prefired in coke.

In addition to about 25 to about 80 weight percent of graphite, the castable material also includes from about 1 to about 15 weight percent of a water dispersible, curable phenolic novolac resin, and from about 70 to about 15 weight percent of one or more refractory aggregates (based on the weight of the monolithic refractory castable composition prior to mixing with water). Suitable phenolic novolac resins are known in the art and available from, for example, Hexion Specialty Chemicals, formerly Borden Chemical, under the Durite® line of products. See for example, the Gerber U.S. Pat. No. 6,046,252, which describes a water dispersible mixture of Durite® phenolic novolac resins of molecular weight 1000-1300 and molecular weight of 4000-8000 (2:8 weight ratio). Typically, the water dispersible phenolic novolacs resins are rendered curable by the inclusion of a curing agent therein. One suitable curing agent is hexamethylenetetramine ("hexa") which often is included in commercially available phenolic novolac resin, for example in an amount of about 1-10 weight percent, based on the weight of the resin, or, more specifically in an amount of about 4-6 weight percent, based on the weight of the resin. The resins are typically used in dry powder form and are included in the castable compositions described herein in an amount of from about 1 to about 15 weight percent, or, more specifically, from about 5 to about 10 weight percent of the weight of the phenolic novolac resin.

The above-described monolithic refractory castable material further comprises one or more refractory aggregates in order to provide, inter alia, abrasion resistance and, optionally, other desired properties. The monolithic refractory castable materials typically comprise from about 70 to about 15 weight percent of the one or more refractory aggregates, or, more specifically, from about 50 to about 15 weight percent, or, more specifically, from about 35 to about 15 weight percent of the one or more refractory aggregates. In a specific embodiment, the one or more refractory aggregates comprise carbon black, pitch (natural and/or synthetic), SiC, $Al_2O_3$, $Cr_2O_3$, $ZrO_2$, $TiO_2$, $Si_3N_4$, $B_4C$, TiC, $CaO.6Al_2O_3$, $Si_2ON_2$ (silicon oxynitride), Sialon (ceramic alloys based on silicon, aluminum, oxygen and nitrogen), aluminum metal powder, copper metal flake, or silicon metal powder, or a mixture of two or more thereof. In another specific embodiment, the one or more refractory aggregates comprise from about 1 to about 40 weight percent SiC, and from about 1 to about 10 weight percent carbon black, pitch, $Al_2O_3$, $Cr_2O_3$, $ZrO_2$, $SiO_2$, $TiO_2$, $Si_3N_4$, $CaO.6Al_2O_3$, $B_4C$, TiC, $Si_2ON_2$, Sialon, aluminum metal powder or silicon metal powder, or a mixture of two or more thereof, based on the weight of the monolithic refractory castable material (prior to mixing with water).

These monolithic refractory castable materials may optionally further comprise other materials conventionally employed in refractory materials for their known advantages, as desired. For example, the monolithic refractory castable materials may comprise up to about 10 weight percent of silica fume and/or up to about 10 weight percent of calcium aluminate and/or calcium oxide. Optionally, the monolithic refractory castable material may further comprise a dispersant, either organic or inorganic, or a mixture thereof, in an amount up to about 1 weight percent, or, more specifically, up to about 0.1 weight percent.

A sufficient amount of water is added to render the mixture castable. In one embodiment, the monolithic refractory castable material is mixed with from about 1 to about 25 weight percent water, based on the weight of the monolithic refractory castable material. In a specific embodiment, the monolithic refractory castable material is mixed with from about 5 to about 15 weight percent water, based on the weight of the monolithic refractory castable material.

In one specific example, a refractory castable material is prepared comprising, on a weight basis, about 64% synthetic graphite, about 19% silicon carbide, about 6% alumina, about 2% calcium oxide, and about 9% water dispersible, curable phenolic novolac resin. This mixture is then combined with water and poured into a suitably shaped mold having the tensile preform (e.g., fiber ring (30)) therein, similar to that shown in FIG. 6. Fiber ring (30), for example, comprises two or three co-wound, continuous carbon fiber tows, wherein the tow binder has been room temperature cured prior to inserting the ring (30) into the mold. After curing of the refractory composition, the reinforced refractory container is removed from the mold and, for example, prefired in coke (e.g., to 2200° F. for 2 hours). During prefiring, the binder used in the fiber belt is volatilized.

Selection of the refractory castable will depend on a variety of factors, such as anticipated operating temperatures, container size, etc. In addition, any of variety of bonding materials are similarly included in some embodiments of the castable composition, including calcium aluminate cement, colloidal silica, alumina, high surface area alumina, high surface area silica, sulfates, resins, phosphates, and nitrogen bonders. In fact, since the tensile preform supplies the desired hoop stress, the tensile preform provides greater flexibility in the choice of bonding materials and other components of the castable composition.

Figure 9:
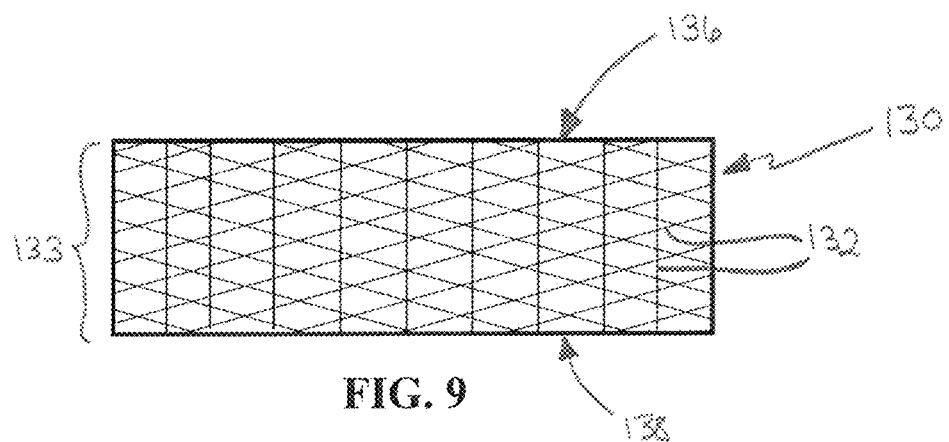
FIG. 9 depicts a side plan view of the fiber preform of FIG. 8.
Figure 10:
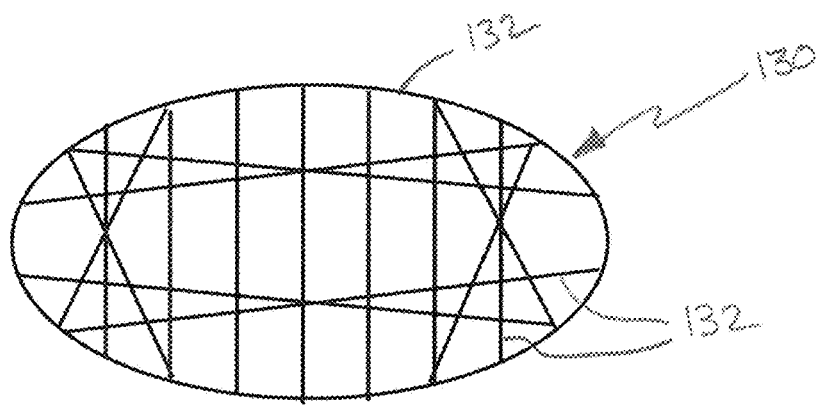
FIG. 10 depicts a bottom plan view of the fiber preform of FIG. 8.
Figure 13:
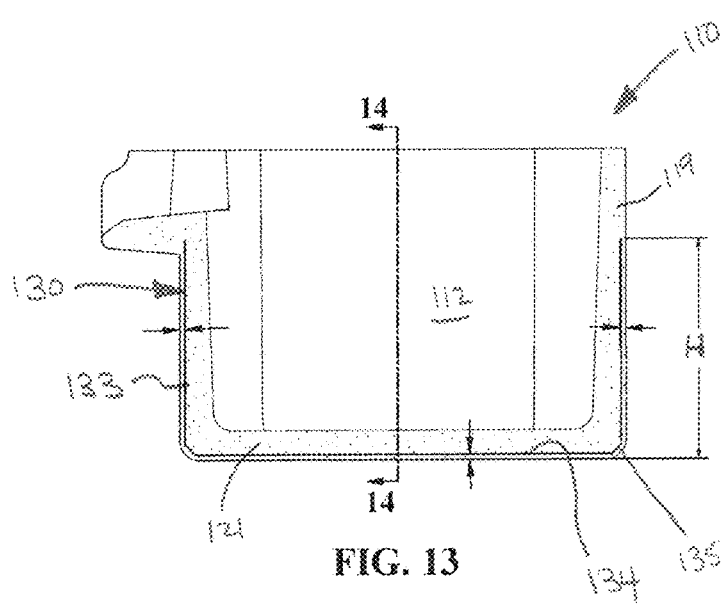
FIG. 13 depicts a cross-sectional view of the refractory crucible of FIG. 12, taken along the line 13-13 thereof.
Figure 14:
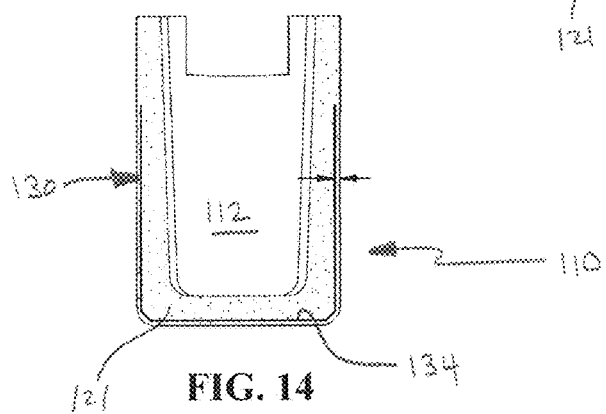
FIG. 14 depicts a cross-sectional view of the refractory crucible of FIG. 13, taken along the line 14-14 thereof.

FIGS. 8-10 depict yet another embodiment of a wound fiber preform (130) which may be fabricated as described above, using any of the materials described above. Fiber preform (130) is configured to be integrated into refractory crucible (110) shown in FIGS. 11-14. Refractory crucible (110) is suitable for use in glass melting and has a lower portion (118) having an oval cross-sectional shape (see FIG. 12) and a removable lid (116) (shown in cross-section in FIG. 11). Sidewall (119) of lower portion (118) defines an interior volume (112) which may be used, for example, to melt glass, metals or other materials at high temperature. FIGS. 13-15 depict the positioning of tensile perform (130) in refractory crucible (110), wherein the tensile perform is shown in dashed line in FIG. 12.

Figure 11:
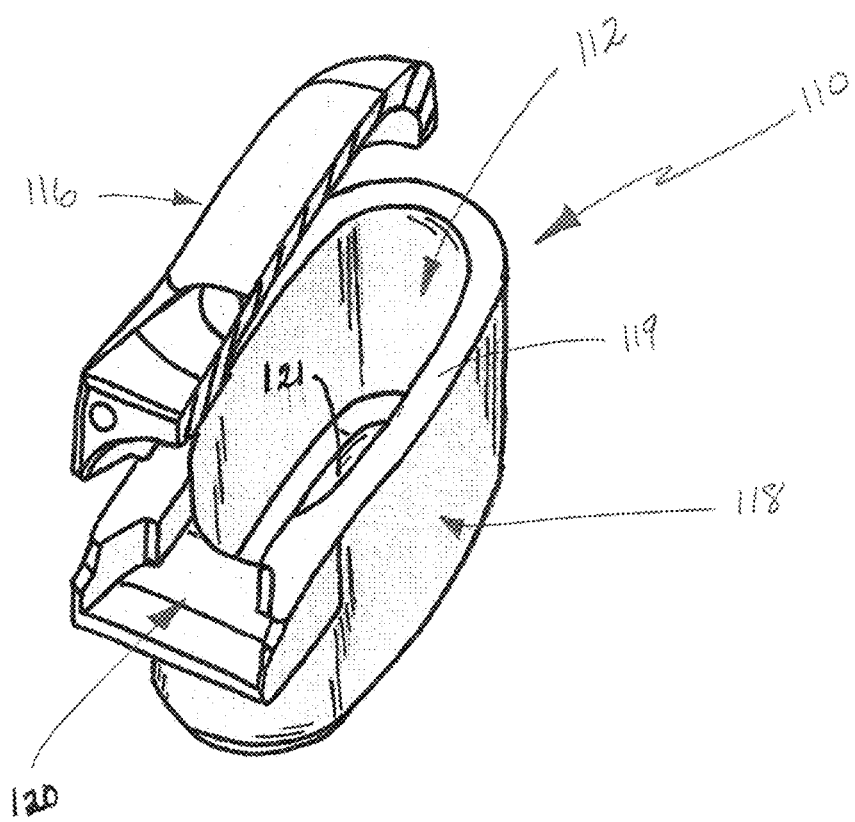
FIG. 11 depicts an isometric view of a refractory crucible, such as used for melting glass (also known in the art as a glass pot).
Figure 12:
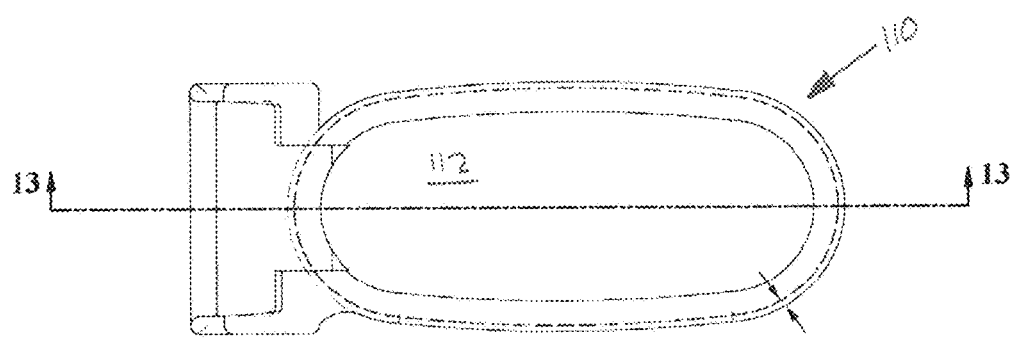
FIG. 12 is a top plan view of the refractory crucible of FIG. 11, with the top removed and the fiber preform of FIG. 8 shown in dashed line inside the sidewall of the lower portion of the crucible.

Refractory crucibles such as that shown in FIG. 11 may be used, for example, for melting or processing metal (e.g., zinc, aluminum, copper, etc.) or glass. The term crucible is also intended to be interpreted broadly so as to include any of a variety of pots, vessels and similar types of containers for holding a material which is heated to a high temperature. Monolithic refractory crucibles (referred herein interchangeably pots or vessels) generally comprise a single open ended cylindrical container or vessel. Vessels meant to contain hundreds of pounds of a substance for heat processing can be cast from a wide variety of castable refractory materials, and reinforced using the tensile preforms described herein. Refractory crucibles and similar refractory vessels generally have a height several times larger than their width, and are typically cylindrical but may also be ovoid to square in shape. Because of the high temperatures used, wide temperature differentials between the inside and outside of the vessel typically arise during use due to the nature of the one-sided heating method. As a result, these vessels will often fail on the tension face in the case of the self-supporting crucibles, or on the interior hot wall of the crucible in a constrained environment such as a coreless induction furnace. Once again temperature differences through the thickness of the container wall, for example, will create mechanical tensile forces on the ceramic refractory shape. Excessive mechanical forces can be built up from the interior surface in the case of a crucible heated from the inside out, or excessive mechanical forces on the exterior crucible wall can arise due to high temperature creep and loading of an unsupported or free standing refractory containment vessel. Both situations result in a crack propagation and failure of the vessel. While the addition of chopped metal fiber reinforcement helps prevent this, these metal fibers add significant weight, may melt at high operational temperatures above about 2400 degrees F. and be rendered futile, suscept in the case of high frequency coreless furnaces operating at such temperatures or above, or be completely undesirable or chemically incompatible (e.g., in the case of glass melts, for example).

The tensile preforms described herein can reduce, delay or even prevent container wall failure, either in unsupported designs or in vessels designed to be contained in a coreless induction furnace and the like.

Fiber preform (130) comprises a container-shaped, tubular section (133), and an endwall portion (138) and an open upper end (136). Fiber preform (130) is configured for reinforcing and supporting refractory crucible (110). Fiber preform (130) is sized and configured so as to fit within or around the sidewall (119) of lower portion (118) of crucible (110). Due to the opening (120) extending through the crucible sidewall at the front upper end of lower portion (118), tubular section (133) of preform (130) has a height H (see FIG. 13) which is less than the height of the lower portion (118) of the crucible. As before, preform (130) is located within the sidewall After manufacture, the wound fiber preform is generally located either on the exterior of the refractory container, or within a the wall of the container (i.e., encapsulated within the refractory material). In some embodiments, the tensile, wound fiber preform is located within the outer half, outer third, outer fourth, outer fifth, or even the outer tenth of the sidewall (119) of the lower portion (118) of the refractory crucible (110).

Preform (130) not only includes tubular section (133) having an open upper end (136), but also a fiber mesh bottom wall (138), thus providing a wound fiber preform (130) which generally has a cup shape. The bottom wall (138) of the preform is positioned within bottom wall (121) of the lower section (118) of the crucible, at the same or different depth as the tubular section (133) of the preform within sidewall (119) (e.g., the bottom half of bottom wall (121)). Tubular section (133) has an oval cross-section which matches the oval cross-section shape of lower portion (119) of the crucible.

As before, tensile preform (130) is formed from the fiber tow(s) by winding the tow(s) around a rotating mandrel using, for example, a multi-axis fiber winding machine. In this instance, the mandrel has an oval cross-sectional shape, and the tow(s) are also wound about one end of the mandrel to provide bottom wall (138) on the preform (130). Any of a variety of winding patterns may be employed, and that shown is merely one exemplary embodiment. An angled transition is provided between the outer circumference of the mandrel and the end thereof, such that an angled (i.e., tapered) transition (135) is provided between the tubular section (133) and bottom end (138) of the preform so as to match the angled bottom edge of the crucible (see FIG. 13).

While several devices and components thereof have been discussed in detail above, it should be understood that the components, features, configurations, and methods of using the devices discussed are not limited to the contexts provided above. In particular, components, features, configurations, and methods of use described in the context of one of the devices may be incorporated into any of the other devices. Furthermore, not limited to the further description provided below, additional and alternative suitable components, features, configurations, and methods of using the devices, as well as various ways in which the teachings herein may be combined and interchanged, will be apparent to those of ordinary skill in the art in view of the teachings herein.

Having shown and described various versions in the present disclosure, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, versions, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. A reinforced refractory container comprising:
  (a) a cast refractory container having a sidewall which defines an interior volume, the sidewall having inner and outer surfaces, said container sidewall cast from a refractory castable, said refractory castable comprising refractory aggregate; and
  (b) a wound, continuous fiber tensile reinforcement structure comprising a tensile fiber preform having one or more continuously wound tows of continuous fibers, with the refractory castable penetrating interstices between the tows such that the fiber preform is completely encapsulated within the refractory castable of the container sidewall;
  wherein said wound, continuous fiber tensile reinforcement structure comprises a tensile preform having a tubular section with an open weave fiber wall; and
  further wherein said one or more wound tows of continuous fibers are chosen from the group consisting of: carbon fibers, glass fibers, SiC-based fibers, basalt-based fibers and oxide fibers.

2. The reinforced refractory container of claim 1, wherein said fiber preform is located within the outer half of the sidewall of the refractory container.

3. The reinforced refractory container of claim 2, wherein said refractory container is in the form of an open-ended cylindrical ring having an outer diameter $D_{RR}$ and a sidewall thickness of $T_{RR}$, and said fiber preform comprises a tubular portion having a height less than the height of said ring and an inside diameter of $D_{TB}$, wherein:

$$(D_{RR} - \tfrac{1}{2}T_{RR}) \leq D_{TB} \leq D_{RR}.$$

4. The reinforced refractory container of claim 1, wherein said container comprises a lower portion comprising said sidewall and a bottom wall which together define said interior volume, and said tensile fiber preform has a tubular section and a bottom wall at one end of said tubular section, wherein the tubular section of the preform is completely encapsulated within said container sidewall and the bottom wall of the preform is completely encapsulated within the bottom wall of the container.

5. The reinforced refractory container of claim 4, wherein the container comprises a glass melting pot.

6. The reinforced refractory container of claim 1, wherein said one or more wound tows of continuous fibers are carbon fibers.

7. The reinforced refractory container of claim 1, wherein said one or more wound tows are held in position by an at least partially cured binder.

8. The reinforced refractory container of claim 1, wherein said refractory container is in the form of an open-ended cylindrical ring having mating structures on its upper and lower surfaces which facilitate stacking of two or more of said rings.

9. The reinforced refractory container of claim 1, wherein said tensile fiber preform maintains hoop stress and provides compressive force that counteracts temperature-induced expansion of the refractory container during use.

10. The reinforced refractory container of claim 9, wherein said refractory castable comprises a graphite-based, monolithic refractory castable material.

11. The reinforced refractory container of claim 10, wherein said graphite-based refractory castable material comprises about 25 to about 80 weight percent of graphite, from about 1 to about 15 weight percent of a water dispersible, curable phenolic novolac resin, and from about 70 to about 15 weight percent of one or more refractory aggregates, based on the weight of the monolithic refractory castable material.

\* \* \* \* \*